US009530199B1

(12) United States Patent
Weinberg et al.

(10) Patent No.: US 9,530,199 B1
(45) Date of Patent: Dec. 27, 2016

(54) TECHNIQUE FOR MEASURING OVERLAY BETWEEN LAYERS OF A MULTILAYER STRUCTURE

(71) Applicant: Applied Materials Israel Ltd., Rehovot (IL)

(72) Inventors: Yakov Weinberg, Modi'in (IL); Ishai Schwarzband, Or-Yehuda (IL); Roman Kris, Jerusalem (IL); Itay Zauer, Rohovot (IL); Ran Goldman, Hod Hasharon (IL); Olga Novak, Tel Aviv (IL); Dhananjay Singh Rathore, Boise, ID (US); Ofer Adan, Rehovot (IL); Shimon Levi, Tivon (IL)

(73) Assignee: Applied Materials Israel Ltd, Rehovot (IL)

( * ) Notice: Subject to any disclaimer, the term of this patent is extended or adjusted under 35 U.S.C. 154(b) by 0 days.

(21) Appl. No.: 14/798,283

(22) Filed: Jul. 13, 2015

(51) Int. Cl.
*G06K 9/00* (2006.01)
*G06T 7/00* (2006.01)

(52) U.S. Cl.
CPC ........... *G06T 7/0004* (2013.01); *G06T 7/0024* (2013.01); *G06T 7/0079* (2013.01); *G06T 2207/10061* (2013.01); *G06T 2207/30148* (2013.01)

(58) Field of Classification Search
None
See application file for complete search history.

(56) References Cited

U.S. PATENT DOCUMENTS

| | | | | |
|---|---|---|---|---|
| 5,694,481 A | * | 12/1997 | Lam | G06K 9/00476 382/145 |
| 5,877,861 A | * | 3/1999 | Ausschnitt | G03F 7/70633 356/401 |
| 6,218,200 B1 | * | 4/2001 | Chen | G03F 7/70633 257/E21.53 |
| 7,065,737 B2 | * | 6/2006 | Phan | G01N 21/95607 430/22 |
| 7,381,503 B2 | * | 6/2008 | Smith | G03F 1/14 430/22 |
| 7,792,351 B1 | | 9/2010 | Toth et al. | |
| 8,126,255 B2 | * | 2/2012 | Bhaskar | G06T 7/001 382/141 |

(Continued)

OTHER PUBLICATIONS

Silver, R. M. et al., (May 2004). High-resolution optical overlay metrology. In Microlithography 2004 (pp. 78-95). International Society for Optics and Photonics. 18 pages.

(Continued)

*Primary Examiner* — Jayesh A Patel
(74) *Attorney, Agent, or Firm* — Lowenstein Sandler LLP

(57) ABSTRACT

A method for determining overlay between layers of a multilayer structure may include obtaining a given image representing the multilayer structure, obtaining expected images for layers of the multilayer structure, providing a combined expected image of the multilayer structure as a combination of the expected images of said layers, performing registration of the given image against the combined expected image, and providing segmentation of the given image, thereby producing a segmented image, and maps of the layers of said multilayered structure. The method may further include determining overlay between any two selected layers of the multilayer structure by processing the maps of the two selected layers together with the expected images of said two selected layers.

15 Claims, 8 Drawing Sheets

(56) References Cited

U.S. PATENT DOCUMENTS

| | | | | |
|---|---|---|---|---|
| 8,138,498 | B2* | 3/2012 | Ghinovker | G03F 7/70633 257/48 |
| 9,093,458 | B2* | 7/2015 | Amir | H01L 23/544 |
| 2002/0144221 | A1* | 10/2002 | Noda | G06T 7/0004 716/112 |
| 2003/0021465 | A1* | 1/2003 | Adel | G03F 7/70633 382/151 |
| 2005/0100802 | A1* | 5/2005 | Callan | G03F 1/144 430/5 |
| 2008/0183323 | A1 | 7/2008 | Menadeva et al. | |
| 2009/0238443 | A1* | 9/2009 | Sato | G06K 9/42 382/145 |
| 2009/0240466 | A1 | 9/2009 | Mangan et al. | |
| 2011/0261264 | A1* | 10/2011 | Zafarifar | H04N 5/145 348/699 |

OTHER PUBLICATIONS

International Roadmap Committee. (2013). International Technology Roadmap for Semiconductors: 2013 Edition Executive Summary. Semiconductor Industry Association, San Francisco, CA, available at: http://www.itrs.net/Links/2013ITRS/2013Chapters/2013ExecutiveSummary.pdf. 6 pages.

Adel, M. et al., (Nov. 2007). The challenges of transitioning from linear to high-order overlay control in advanced lithography. In Photonics Asia 2007 (pp. 682722-682722). International Society for Optics and Photonics. 10 pages.

Ausschnitt, C.P. et al., (Mar. 2006). Multi-layer overlay metrology. In SPIE 31st International Symposium on Advanced Lithography (pp. 615210-615210). International Society for Optics and Photonics. 10 pages.

Englard I. et al., (Mar. 2008). Accurate in-resolution level overlay metrology for multipatterning lithography techniques. In SPIE Advanced Lithography (pp. 69221D-69221D). International Society for Optics and Photonics.,9 pages.

Hotta, S., et al., (Mar. 2010). Concerning the influence of pattern symmetry on CD-SEM local overlay measurements for double patterning of complex shapes. In SPIE Advanced Lithography (pp. 76381T-76381T). International Society for Optics and Photonics. 13 pages.

Dasari, P. et al., (Mar. 2010). A comparison of advanced overlay technologies. In SPIE Advanced Lithography (pp. 76381P-76381P). International Society for Optics and Photonics. 9 pages.

Felix, N. M. et al., (Mar. 2010). Smaller, smarter, faster, and more accurate: the new overlay metrology. In SPIE Advanced Lithography (pp. 76380Y-76380Y). International Society for Optics and Photonics. 7 pages.

Eichelberger, B., et al., (May 2008). Overlay Control Requirements for Immersion Lithography. In 2008 IEEE/SEMI Advanced Semiconductor Manufacturing Conference (pp. 359-365). IEEE. 7 pages.

R. M. Silver et al., "High Resolution Optical Overlay Metrology," Proceeding of SPIE vol. 5375 (SPIE, Bellingham, WA 2004), 18 pages.

ITRS, "International Technology Roadmap for Semiconductors," 2013 edition Lithography Summary. Link to ITRS 2013 <http://itrs.net/ITRS%201999-2014%20Mtgs,%20Presentations%20&%20Links/2013ITRS/2013Chapters/2013Litho_Summary.pdf>, 6 pages.

C.P. Ausschnitt et al, "Multi-Layer Overlay Metrology," Proc. SPIE 6152, 2006, 10 pages.

Eichelberger et al., "Overlay Control Requirements for Immersion Lithography," 2008 IEEE/SEMI Advanced Semiconductor Manufacturing Conference, 7 pages.

\* cited by examiner

TECHNIQUE FOR MEASURING OVERLAY BETWEEN LAYERS OF A MULTILAYER STRUCTURE

FIELD OF THE INVENTION

The present invention relates to a technique for determining overlay between layers of a multilayer structure by analyzing an image which represents such a structure. For example, the invention relates to automated inspection of modern integrated circuits which constitute micro-miniature semiconductor structures with multiple layers produced by lithography. More specifically, the invention relates to overlay assessment techniques which require utilizing a Scanning Electron Microscope (SEM) for obtaining the representing image.

BACKGROUND OF THE INVENTION

Many technological fields may suggest examples of complex multilayer physical objects. Internal structure of such objects may be studied by analyzing available images of the objects. Examples of such analysis may be found in inspection of modern 3D semiconductor structures, as well as in geophysics, biology, medicine, in medical equipment technologies such as Computer Tomography, etc. The images to be analyzed may be obtained by various technologies utilized in the corresponding fields.

The present patent application will describe the mentioned technique using an example from the field of inspection of modern multilayer semiconductor structures.

The modern multilayer semiconductor structures of interest have arrived to such a scale of miniaturization (presently, up to nodes scale of about 7-10 nm) that they cannot be inspected with required accuracy and resolution by optical microscopes, since information provided by optical microscopes is a result of processing of visual images. For such modern structures, there is a theoretical option to apply complex, model-based analysis methods for processing data obtained by visual measurements.

An alternative, more practical option is to utilize technologies involving tools having resolution higher than that in optical microscopes.

Such tools, for example scanning electron microscopes (SEMs), are often used in inspection of semiconductor wafers. SEMs may be used to detect and classify defects in production of microelectronic devices, to provide sophisticated process control, etc. SEM images, however, contain a wealth of detail, which must be properly interpreted in order to identify the structures appearing in each image, to distinguish the structures from other features and to estimate their relative coordinates.

In order to proceed with the description, some comprehensive definitions have been introduced below, which are important for understanding the problem and the exemplary solutions which will be described below.

Three-dimensional integrated circuit (3D IC)—an integrated circuit manufactured by stacking silicon wafers and/or dies and interconnecting them vertically using through-silicon vias (TSVs) so that they behave as a single device. In the present description, we speak about 3D IC manufactured using fab processes by gradually depositing multiple layers (dies) one onto another. 3D IC is one preferred example of a Multilayer structure.

SEM—Scanning Electron Microscope used for exposing a 3D IC to a primary electron beam, collecting data on responsive electron beams or scattering electrons from multiple layers of the 3D IC and further reconstructing a combined SEM image of the multiple layers by applying computer processing to the collected data.

Available image or Given image—an image representing a real multilayer structure; SEM-image—an example of Available/Given image.

CD SEM—Critical Dimensions Scanning Electron Microscope, which is applicable in a wide range of nodes having dimensions from about 3000 nm to about 7 nm. CD-SEM delivers High Resolution, High Throughput, High Sensitivity and High Repeatability by utilizing more sophisticated electron optics and advanced image processing.

Expected image—image of one or more specific details/features/structures to be constructed and/or to be found in a specific layer of a multilayered structure. For example, the Expected image may be a design image, for example a CAD-image created by utilizing CAD (computer-aided design) tools for designing features of a specific layer. Expected image may be a design image, simulated so as to look closer to a real object after manufacturing thereof according to the design.

A combined Expected image—image obtained by combining Expected images of layers of the multilayer structure, taking into account visibility of the layers and elements thereof.

Overlay (OVL)—vector characterizing pattern-to-pattern alignment of one layer of a multilayer structure with respect to another layer thereof.

Modern silicon wafers are currently manufactured in a sequence of steps, each stage placing a pattern of material on the wafer; in this way transistors, contacts, etc., all made of different materials, are laid down. In order for the final device to function correctly, the separate patterns of the layers must be aligned correctly. Overlay control is control of the above-mentioned pattern-to-pattern alignment.

Registration—maximally possible alignment of two or more images by recognition of their mutual positioning. For example, registration may be performed by achieving maximal possible overlapping between the images. Various technologies of registration exist; a version of registration, customized for advanced semiconductor nodes will be proposed in the present description.

Segmentation of available image—labeling pixels of the available image to associate the pixels with different classes of features (objects, elements). The features may be located at different layers of the multilayer structure. Image segmentation is typically used to locate objects and boundaries (lines, curves, etc.) in images. More precisely, image segmentation is the process of assigning a label to every pixel in an image such that pixels with the same label share certain characteristics. For example, a specific label may indicate a specific layer of the structure.

Segmentation of SEM-image—labeling pixels of a SEM-image of a multilayer structure, in order to obtain a segmented image Segm(x,y) where similarly labeled pixels form segments. The Segmentation is a process of labeling pixels of the SEM image by assigning, to every pixel having coordinates(x,y), an index j being index of the layer to which this pixels belongs. The index j may accept values from the interval {1 . . . N} where N is a number of layers of the multilayer structure.

Maps of layers of an N-layer multilayer structure—is a set of N binary images each having the size of the given image.

Map of a specific layer is a binary image comprising features of that layer only, which are visible on the Given image (and consequently on the Segmented image), and which are represented on the Map by areas of pixels (segments) labeled with the label of that specific layer. It may be written down as follows:

Map (x, y){j}={1, if Segm (x,y)=j; 0 if Segm(x, y)≠j, 1<=j<=N, where N is a number of layers}.

The terms "area of pixels" and "segment" will be used intermittently in the description.

There is a long felt need in solutions for effective and accurate estimation of overlay in multilayer structures, for example such as modern micro miniaturized multilayer semiconductor structures.

SUMMARY OF THE INVENTION

One of the objects of the invention is providing a more universal technique for analysis of an image representing a real multilayer structure in order to determine overlays between layers of the structure.

A more specific object of the invention is providing an effective and accurate technique for overlay measurement in multilayer semiconductor structures. That object has been recognized by the Inventors as a long felt need for a centralized, global measurement of overlay in the modern semiconductor multilayer structures.

Such effective and accurate solutions are expected to allow reliable estimation of overlays/shifts in the multilayer structure, to minimally affect the desired throughput during the fab process, and to enable on-line adjustment of the fab process.

According to a first aspect of the invention, there is provided a method for determining overlay between layers of a multilayer structure, the method comprising providing an image (a so-called given image or available image) representing the multilayer structure, obtaining expected images for respective layers of the multilayer structure;

providing a combined expected image of the multilayer structure (as a combination of the expected images of said layers, taking into account an order of the layers and visibility/expected occlusions due to placement of the layers one onto another);

performing registration of the given image against the combined expected image;

providing segmentation of the given image, thereby producing a segmented image, (wherein each pixel of the segmented image is associated with a label indicating a layer of the multilayer structure to which the pixel is related, thereby creating areas/segments of pixels having identical labels), and segmentation maps, also called maps of the layers of said multilayered structure (wherein such maps is a set of binary images, and wherein a specific layer's map is a binary image comprising features of that layer only, which are visible on the given image (and therefore on the Segmented image) and which are represented on the map by segments labeled with the label of that specific layer);

determining (measuring) overlay between any two selected layers of the multilayer structure by processing the maps of the two selected layers together with the expected images of said two selected layers.

Advantageously, the proposed method allows determining overlay for each layer of the multilayered structure, with respect to any of the remaining layers. In practice, overlay may be determined for all layers of the structure, in any combinations.

It should be noted, that the expected images of the layers and/or the combined expected image may be understood as design images which have undergone simulation, for creating similarity thereof to the given image of the real multilayer structure (i.e., to imitate real appearance of the combined image/layers upon fabrication). Such expected images are called simulated design images.

According to one version of the method, it is a method of measuring overhead between layers of a multilayered semiconductor structure, wherein the multilayer structure is a semiconductor structure such as 3D IC, for example a wafer, the given image is a SEM-image of the 3D IC, the expected images are simulated design images (for example, CAD-images of the layers, simulated so as to imitate real appearance of the layers upon fabrication), the combined expected image (for example, a combined CAD-image) is formed by combining the mentioned design images of the layers taking into account the order of the layers and the expected occlusions;

the segmentation is a SEM-image segmentation, thereby producing a segmented image (SEM-image) of the structure, and also separate maps (SEM-maps) of the layers, the overlay between any two layers of the 3D IC is determined by processing the maps of the two layers together with the expected, preferably simulated images of said two layers (for example, by processing the SEM-maps of these layers using the simulated CAD-images of the same layers).

It should be noted, that the segmentation may refer to the expected images of the layers, i.e. the method may comprise taking the expected images into account while performing the segmentation.

The proposed technique may be improved by iteratively enhancing the segmentation, so as to more accurately distinguish features located on different layers or on the same layer, per pixel of the given image (SEM-image).

Results of the segmentation may be corrected by adjusting the expected image(s) of the layer(s). It can be done based on the measured overlay.

Therefore, the segmentation results may be enhanced by using feedback about the measured overlay.

It should be noted that a different technique intended for measuring overlay and using segmentation may also be improved by iteratively enhancing the segmentation based on results of the overlay measurements.

Consequently, upon correcting the segmentation results, results of the overlay measurement will also be improved.

In view of the above, the method may comprise correcting the segmentation results by:

correcting the expected image of a specific layer based on the overlay value measured relative to the specific layer, (for example, by changing coordinate(s) of the expected image by shifting), correcting the segmentation by taking into account the corrected expected image, for example by obtaining a corrected map of the specific layer, based on the corrected expected image of said specific layer;

The overlay may be then measured again, based on the corrected segmentation, and the method may be continued iteratively.

The mentioned feedback, and more specifically the step of correcting the expected image (CAD-image) of a layer may be caused, for example by a situation where the measured overlay does not exceed a predetermined limit of overlay and/or can be improved by shifting/adjusting CAD-image of the layer to be closer to the corresponding map (SEM-map) of the layer, thus improving the segmentation results on the next step of the process.

The method may comprise as many iterations as allowed by a set of existing/predetermined limitations. The limitations may relate to time, quality and cost of the overlay measurement procedure, overlay value, etc. Some other limitations will be mentioned as the description proceeds.

For more effective overlay measurement, the method may comprise taking into account additional, probable occlusions which could be caused within one or more predetermined limits of acceptable offset.

Such limits may be known in advance for manufacturing multilayer structures (such as semiconductor wafers) that satisfy specific quality requirements. One example of the discussed limits may be "CAD to SEM maximal variation" which limits acceptable changes of elements' sizes on a layer. Another example of the limits is "CAD to SEM maximal shift", which limits acceptable overlay between specific layers. For example, elements of one transistor, which are deposited on different layers of the structure, will not form the properly operating transistor if overlays between these different layers and/or sizes of the elements vary over a set of some predetermined accepted limits Structures where the overlay exceeds the predetermined limit/s are usually considered as defective. In some cases, when CAD correction is performed (say, the layer's CAD image is shifted to become closer to the segmented image of the layer), the segmentation could be improved through more confident use of CAD information.

The additional/probable occlusions may be taken into account at the step of segmentation and even thereafter, to define so called safe areas on the expected images of the layers and respectively on the maps of the layers, said safe areas being those associated with such segments of elements belonging to said layer, which segments would be visible on the given image despite the expected and the additional (probable) occlusions and distortions between the expected images and the given image. An example of such a distortion may be a CAD-SEM images deviation.

In other words, the safe areas relate to segments of the elements, which remain visible i.e., cannot be occluded by any limited offset or distortion (maximal possible overlay, probable variations of sizes, etc.). It goes without saying that elements which are not occluded at all will be considered to form safe areas on the expected images and on the maps of the layers.

The use of segmentation results referring to the safe areas would be considered more effective/reliable.

The step of determining (measuring) of overlay between any two layers of the multilayer structure may be performed, for example, according to one of the following two versions.

In a first version of measuring overlay, the method may comprise:
 for each of the two selected layers, performing per-layer registration between the map (a SEM-map) of the specific layer with the expected image (a design/CAD-image) of the same specific layer, by referring to the safe areas;
 for each of the two selected layers, measuring a shift (or vector of registration) of a specific layer by comparing the map (a SEM-map) of the specific layer with the expected image (a design/CAD-image) of the same specific layer, thereby obtaining two shifts of the two selected layers respectively;
obtaining the overlay between said two selected layers as a difference between said two shifts.

The measurement of the shift (the vector of registration) may be presented as measuring of X/Y shift of the map (say, SEM map) of the specific layer along two axes X and Y with respect to the expected image (say, CAD-image) of said specific layer;
For example,
X-component of the shift of layer "i" along axis X may be determined close to the equation 1:

$$\Delta Xi = XSEMi - XCADi \quad [1]$$

X-component of the overlay of layer "i" in respect of layer "j" can be determined close to the equation 2:

$$\Delta Xi - \Delta Xj = XSEMi - XSEMj + (XCADj - XCADi)$$
$$= XSEMi - XSEMj + \text{offset}, \quad [2]$$

where $(XCADj - XCADi) = \text{offset} = \text{const}$
The analogous operations are performed for axis Y, to obtain Y-component of the overlay.

It should be noted that said per-layer registration may be performed more effectively if the registration is based on the safe areas described above.

According to a second option of measuring the overlay, the method may comprise:
 choosing two safe areas (MSA) respectively appearing in the two selected maps of the two selected layers;
 allocating two segments (ESA) respectively appearing in the two expected images of the two selected layers, said two segments ESA respectively corresponding to said two areas MSA;
 determining a vector V1 (vector of overlay $S_{img}$) of overlay for the two chosen safe areas MSA by calculating a difference between Centers of Gravity (COG) thereof;
 determining a vector V2 (vector of overlay $S_{exp}$) for the two segments ESA by calculating a difference between Centers of Gravity (COG) thereof;
 determining overlay between the selected two layers by calculating a difference between V1 and V2.

For inspection of semiconductor structures, V1 is preferably estimated on the SEM image, while V2 is estimated on the CAD image.

The second option of the overlay measurement may be performed when only one of said two areas is MSA and/or only one of said two segments is ESA, while the other areas/segments are not the safe areas.

Again, the method is advantageous since it is adapted to perform measurement of overlay for any number of additionally selected alternative pairs of the layers, in other words—for all layers of the multilayer structure.

The inventive method may alternatively be defined as follows:

A method for performing determining overlay between layers of a multilayer structure, the method comprising
 obtaining a given image representing the multilayer structure,
 obtaining expected images for respective layers of the multilayer structure and a combined expected image of the multilayer structure;
 performing registration of the given image against the combined expected image;
 performing segmentation of the given image;
 determining overlay between any two selected layers of the multilayer structure,
 correcting results of the segmentation using feedback about the determined overlay.
The method may further comprise re-determining overlay using the corrected segmentation results.

Yet another independent definition of the inventive method may be as follows:

A method for determining overlay between layers of a multilayer structure, the method comprising obtaining a given image representing the multilayer structure, obtaining expected images for respective layers of the multilayer structure and a combined expected image of the multilayer structure;

performing registration of the given image against the combined expected image;

providing segmentation of the given image, thereby producing a segmented image, and maps of the layers of said multilayered structure;

determining safe areas on the expected images and on the maps of the layers, wherein a safe area representing a segment of an element on a specific layer, which segment cannot be occluded by any predetermined offset;

determining overlay between any two selected layers of the multilayer structure by processing the maps of the two selected layers together with the expected images of said two selected layers, by utilizing the determined safe areas.

It should be kept in mind that the method described above is advantageous for inspecting the multilayer structures such as modern semiconductor wafers or 3D IC, based on SEM-imaging of the structure and preliminarily designed images of the layers. Moreover, it easily allows measuring overlay values for all layers of the structure.

During fabrication of a 3D integrated circuit, upper layers of the 3D IC may still be removed if they introduce a critical overlay. The process may be continued to replace the removed layers with new ones, probably using corrected CAD-images for the corresponding layers. When overlay values can be corrected by correcting CAD-images, this may be performed by providing a high-order Stepper (scanner) correction before production of a next wafer.

The scanner is able to process up high order correction along each axis, for example (a+bx+cx^2+dx^3), where x is an overlay between two specific layers. Using CD-SEM overlay results and some overlay mathematical model, a user/customer can find those coefficients a, b, c, d and use them in the scanner to fix the aberrations.

The newly proposed method is effective for any structures and especially advantageous for 3C IC structures inspected using SEM, since it is generic, i.e. does not depend on geometry of layers to be inspected, global, i.e. allows performing measurements between layers and not between elements in the layers;

comprehensive/universal, since the information is obtained for all layers of the structure simultaneously (in parallel); the information allows computing overlay for any pair of the layers;

allows feedback for improving accuracy by iteratively improving segmentation of the available image.

robust, since it is stable to noise or to low signal to noise (SNR) ratio, accurate, by providing measurements with sub-nm accuracy.

According to a second aspect of the invention, there is also provided a system for image processing, including a memory, which is configured to store a given image (for example, SEM-image) of a multilayer structure (for example, 3D IC) and expected images of the layers. In one example, the expected images are design (CAD) images of the layers used in fabricating the 3D IC; in another example they are design images simulated to suit the given image. The system also comprises a processor configured to generate a combined expected image (optionally, with preliminarily simulating the design images), to process the given image with the combined expected image so as to perform registration there-between, to perform segmentation of the given image into maps of the corresponding multiple layers of the structure, and to perform overlay measurement between any two layers of the structure, based on the maps and suitable expected images of said two layers.

There is additionally provided, in accordance with an embodiment of the present invention, a computer software product, including a non-transitory computer-readable medium in which program instructions are stored, which instructions, when read by a computer, cause the computer to perform steps of the method described above.

The invention will further be described as the description proceeds.

BRIEF DESCRIPTION OF THE DRAWINGS

The invention will be explained in more detail with the aid of the following non-limiting drawings in which:

In FIG. 1, the structure is a semiconductor wafer, the initial (given) image is obtained by SEM and processed by a computer processor.

DETAILED DESCRIPTION OF EMBODIMENTS

Figure 1:
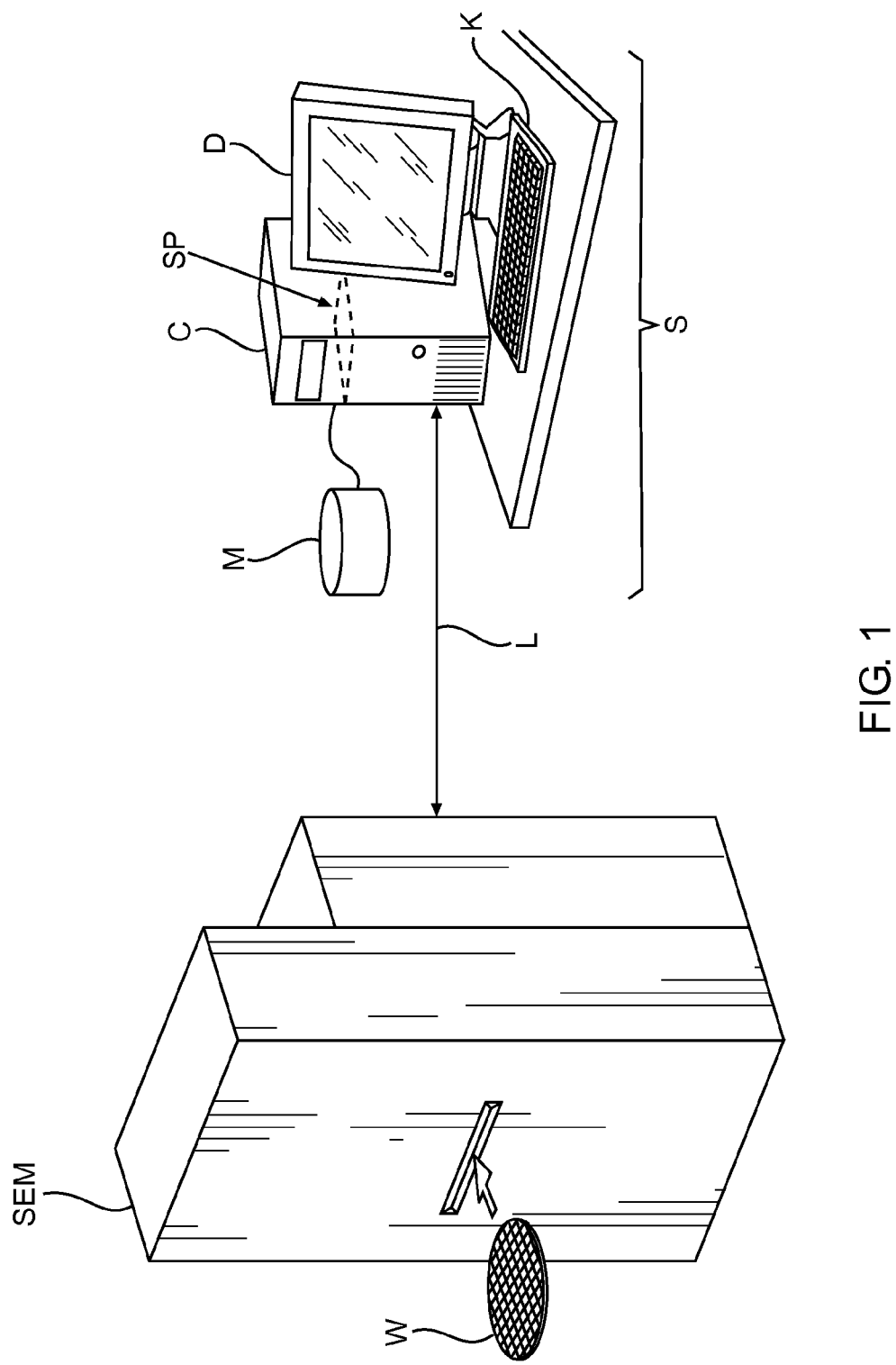
FIG. 1—schematically illustrates an embodiment of the system adapted to perform the inventive method for measuring overlay in a multilayer structure.

FIG. 1 is a pictorial presentation of an exemplary set of equipment for implementing one embodiment of a system S according to the invention. In the example shown in FIG. 1, the system S is intended for inspection of multilayer semiconductor structures (3D IC, wafers) using an electron scanning microscope SEM.

The system S comprises a computer C with the processor (not shown) and the memory which is shown schematically as an external block M. The computer is also equipped with a display D and a keyboard K so that an operator may control and adjust the inspection process. The computer C is in communication, via line L, with the scanning electron microscope SEM which is adapted to create an image of a three-dimensional multilayer structure (a semiconductor wafer W is shown).

The SEM-image obtained in the SEM is transmitted to the computer C, where it is processed and stored in the memory M.

Memory M of the computer C also can store a set of expected images preliminarily developed for layers of the wafer W.

Operation of the system S is focused on measuring overlay between layers of the wafer, based on processing the given image (SEM-image) and the expected images.

The expected images may be CAD images designed for the layers. Alternatively, the expected images may be formed from the design images upon simulation, in order to make them looking maximally similar to real patterns on layers of the real structure of interest.

In the present example, the computer software may comprise one or more programs for simulation of the design images so as to convert them into expected images maximally close to images which could be obtained upon manufacturing the layers and scanning them by the SEM. The specific embodiment of the proposed system, intended for measuring overlay in semiconductor wafers, operates more effectively with such a simulation. The computer accommodates some computer readable media which contains the proposed software product (schematically shown as a dotted contour SP) responsible for novel functions of the system. Some of the functions will be described with reference to flowcharts illustrated in the following drawings.

Figure 2:
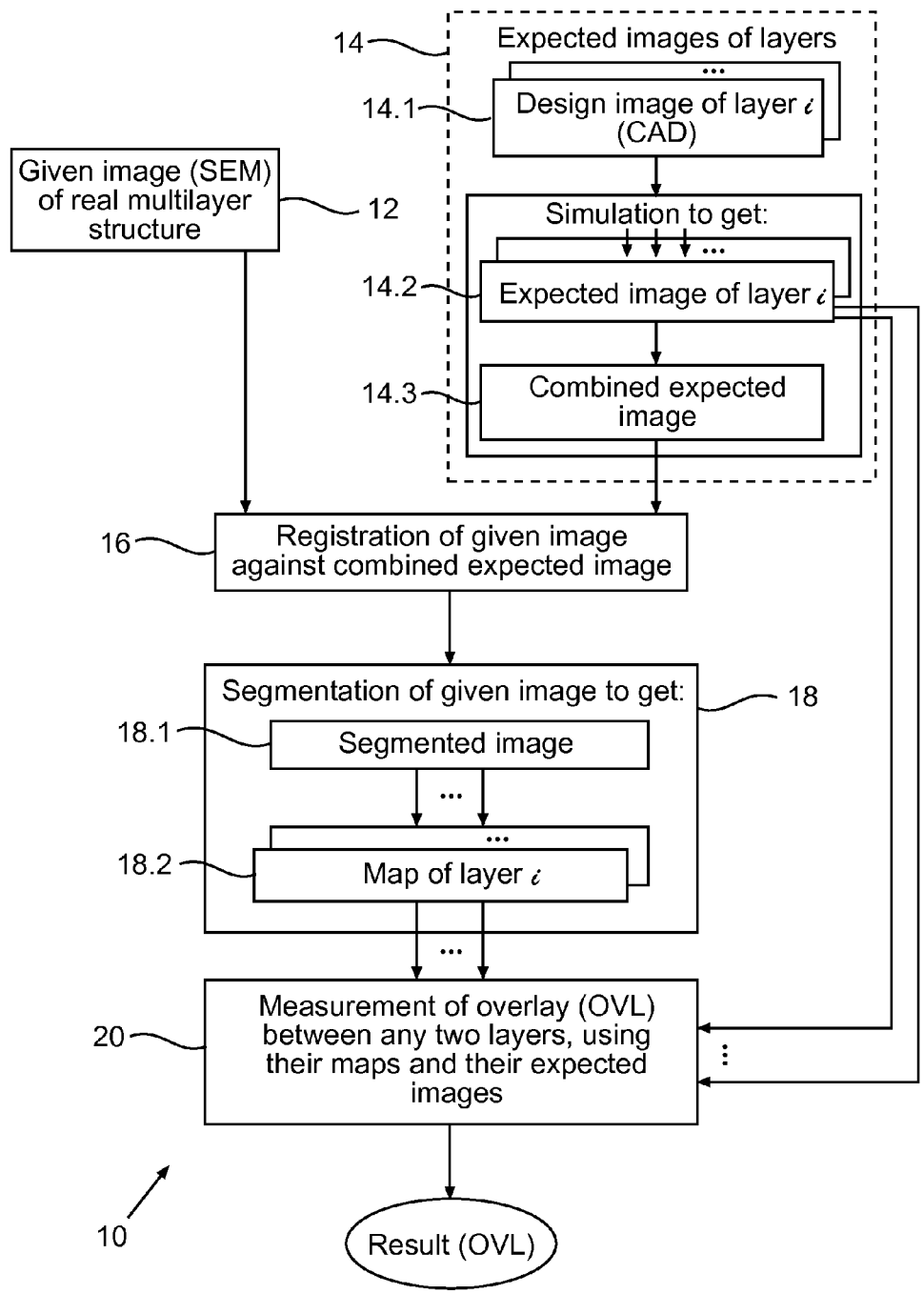
FIG. 2 illustrates a schematic block diagram of one version of the proposed method.

FIG. 2 shows a flow chart of one version of the proposed method. The version 10 may serve a basic one for some modifications of the method.

Block 12: obtaining a given image of a real multilayer structure. In a specific example described in the present application, the given image is a SEM-image generated by a scanning electron microscope.

Block 14: obtaining expected images of layers of the multilayer structure.

Box 14.1 indicates a plurality of design images developed for multiple layers of the structure, including an exemplary layer "i".

Block 14 may comprise Simulation of the design images, as follows:

Box 14.2 indicates that the design images may be simulated to respectively form expected images of the multiple layers;

Box 14.3 indicates that a combined expected image may be obtained from the simulated images of the layers.

The expected images may be, for example, CAD images or simulated CAD images.

The mentioned variations of the expected images are stored in the computer memory.

Further, the given image may be compared with the expected images, using the following operations.

Block 16 indicates that the given image (SEM-image) is registered with respect of the combined expected image.

Block 18 is responsible for Segmentation of the given image, namely:

Box 18.1 denotes that a segmented image is obtained, which means that each pixel of the given image is "labeled" by a label indicating the layer to which the specific pixel is related. The segmented image is stored in the computer memory.

Box 18.2 indicates that a plurality of layer maps (including the map of an exemplary layer "i") are then formed from the segmented image and stored in the memory. In our specific example, the maps are SEM-maps of the respective layers.

Optionally, the segmentation process which is performed in boxes 18.1 and 18.2 may be assisted and facilitated by taking into account the suitable expected images received in block 14 (these optional arrows are not shown in FIG. 2).

Block 20 is a block of overlay (OVL) measurement. The concept of measuring overlay proposed by Block 20 is the basis of a so-called global overlay measurement. Namely, OVL between any two layers in a multilayered structure can be measured by processing their expected images and their maps together. If in our specific example the expected images are CAD-images, overlay between any two selected layers can be measured by processing the CAD-images and the SEM-maps of the selected two layers.

Some specific implementations and combinations of the concepts defined in the flowchart 10 will be described with reference to the following drawings.

Figure 3:
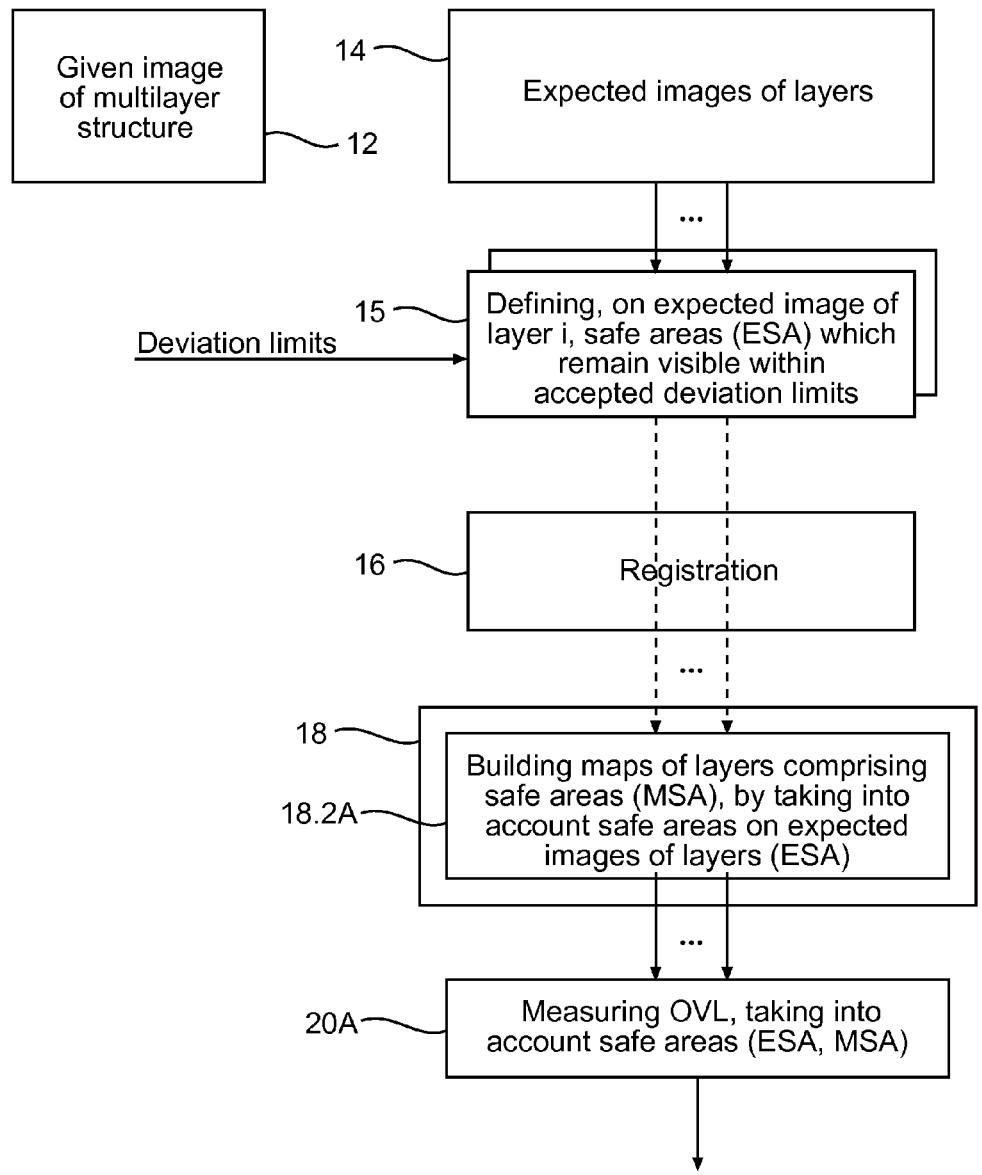
FIG. 3 illustrates a block diagram of another version of the proposed method, which comprises determining areas safe from occlusion on expected images of the layers and on their maps, which safe areas allow more effective segmentation and, consequently, more accurate measurement of overlay.

FIG. 3 shows a fragment of a flowchart, illustrating how an additional feature, namely so-called safe areas, may be determined and combined with the method shown in FIG. 2.

It should be noted, however, that the concept of safe areas may be used also with other methods for inspection of semiconductor structures, not only with the methods of overlay measurement described in this patent application.

The safe areas are defined in a new Block 15.

Block 15 comprises defining safe areas for each layer "i", first on the expected image of that layer (in our specific example, on the simulated CAD-image of the layer). The safe area should be understood as such an area of an element/feature of the specific layer, which area cannot be occluded by any limited offset. In other words, a safe area of a feature of a specific layer should remain visible (i.e. not occluded by features belonging to other layers) at maximal allowed deviations of the features' sizes and of X/Y overlay between layers. There are predetermined limits of those deviations. The deviation limits are schematically indicated by an arrow of data fed to the block 15. The defined safe areas are usually smaller than the expected visual segments of the features, i.e. than those considered visible in the expected images of the layers.

Figure 7:
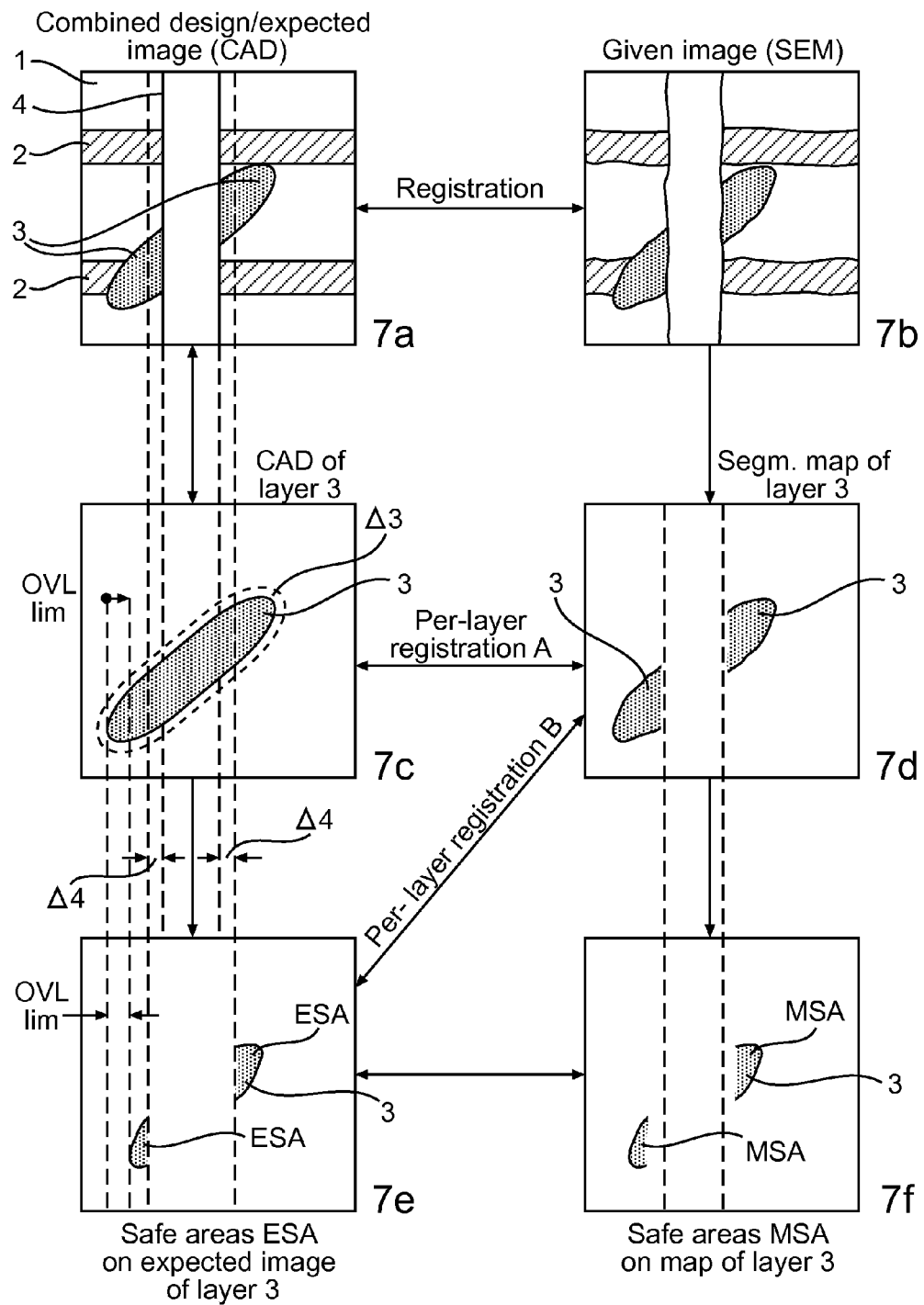
FIG. 7 presents a schematic illustration of different stages of the proposed process by pictorial illustrations of: a combined expected image and a given image of a structure; an expected image and a map of one layer; stages of defining so-called safe areas.
Figure 8:
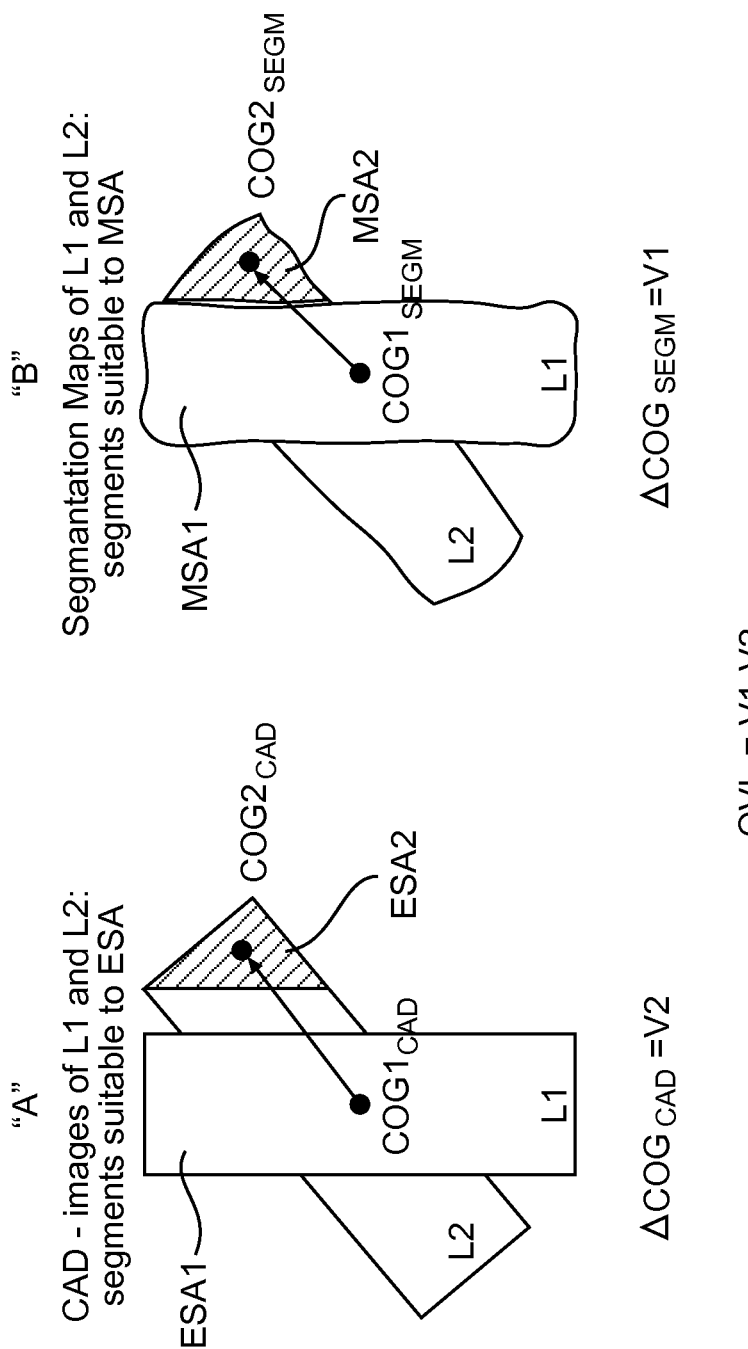
FIG. 8 is a schematic illustration of the exemplary process shown in FIG. 6.

(FIGS. 7 and 8 will further provide some pictorial illustrations of the safe areas' meaning.)

Block 15 defines such safe areas on an expected image (say, a CAD image) of a specific layer. Let these safe areas be called ESA (expected safe areas). How it is done? A pixel of the expected image, which was designed as visible and still remains visible at any allowed deviations—will be considered to belong to an ESA. The similar operation is performed for each layer of the structure.

Optionally, the expected images of the layers, with the defined safe areas ESA, may be used for obtaining the combined expected image (block 14.3, not shown in FIG. 3) and then for proper registration in box 16.

In our example, the safe areas ESA defined in Block 15 are then used for improving the Segmentation in Block 18. Namely, the safe areas ESA are taken into account when building maps of the layers (say, SEM-maps) in the modified box 18A. The obtained map of a specific layer will comprise map safe areas MSA corresponding to the ESA which were defined for that specific layer.

Each MSA may be defined by comparing a specific ESA with the map of the layer of interest.

The safe areas determined on the expected images and maps of the layers (ESA and MSA) are then used for accurate measurement of overlay between two selected layers. Due to that, the general Block 20 is modified in FIG. 3 and marked 20A (since the OVL measurement is based on the safe areas.)

Figure 6:
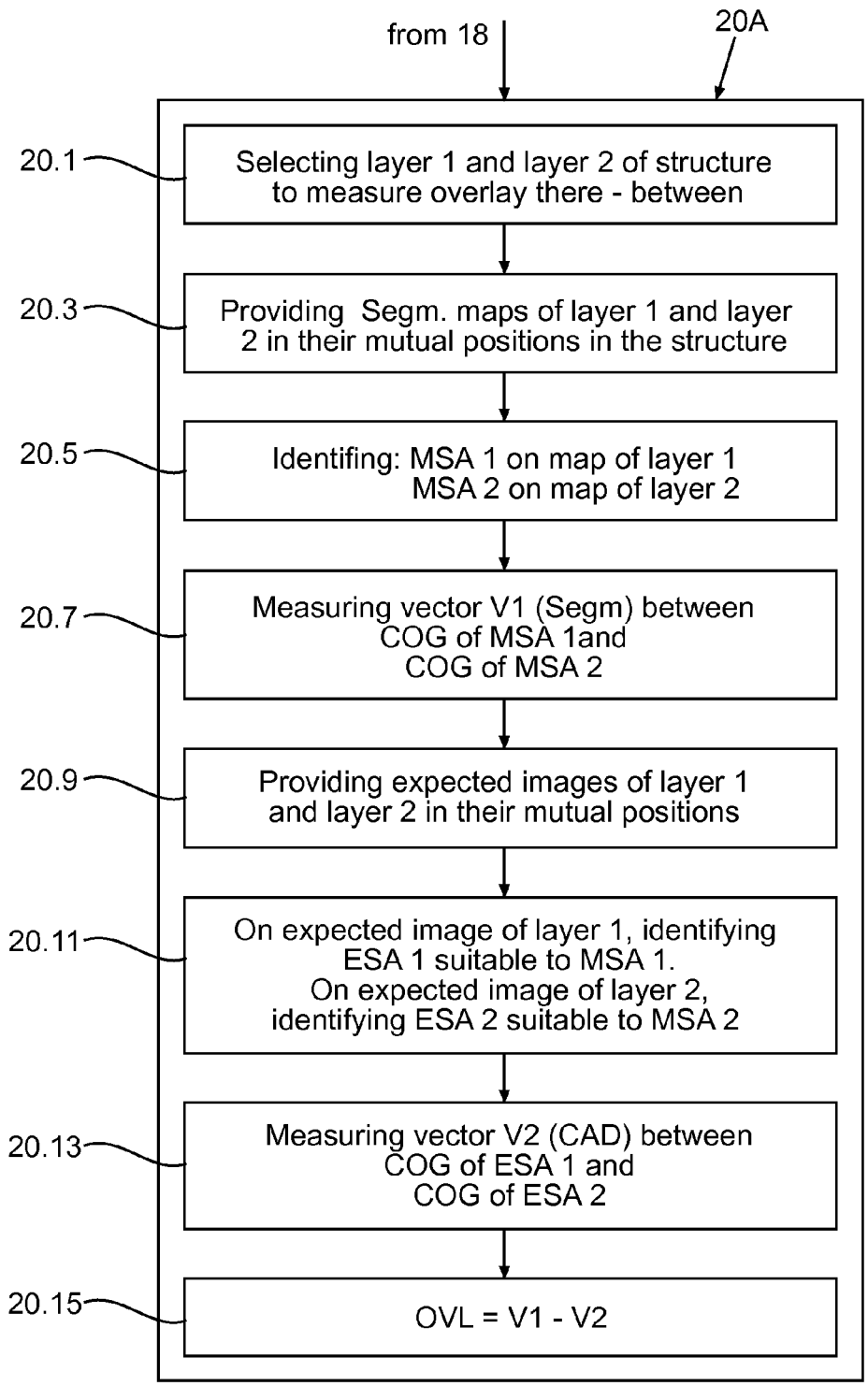
FIG. 6 illustrates a block diagram of another exemplary process (using COGs approach based on safe areas) for measuring overlay between two selected layers of the multilayer structure.

Examples of using safe areas for overlay measurement will be presented in the flow chart of FIG. 6 and in a pictorial presentation of FIG. 8.

Figure 4:
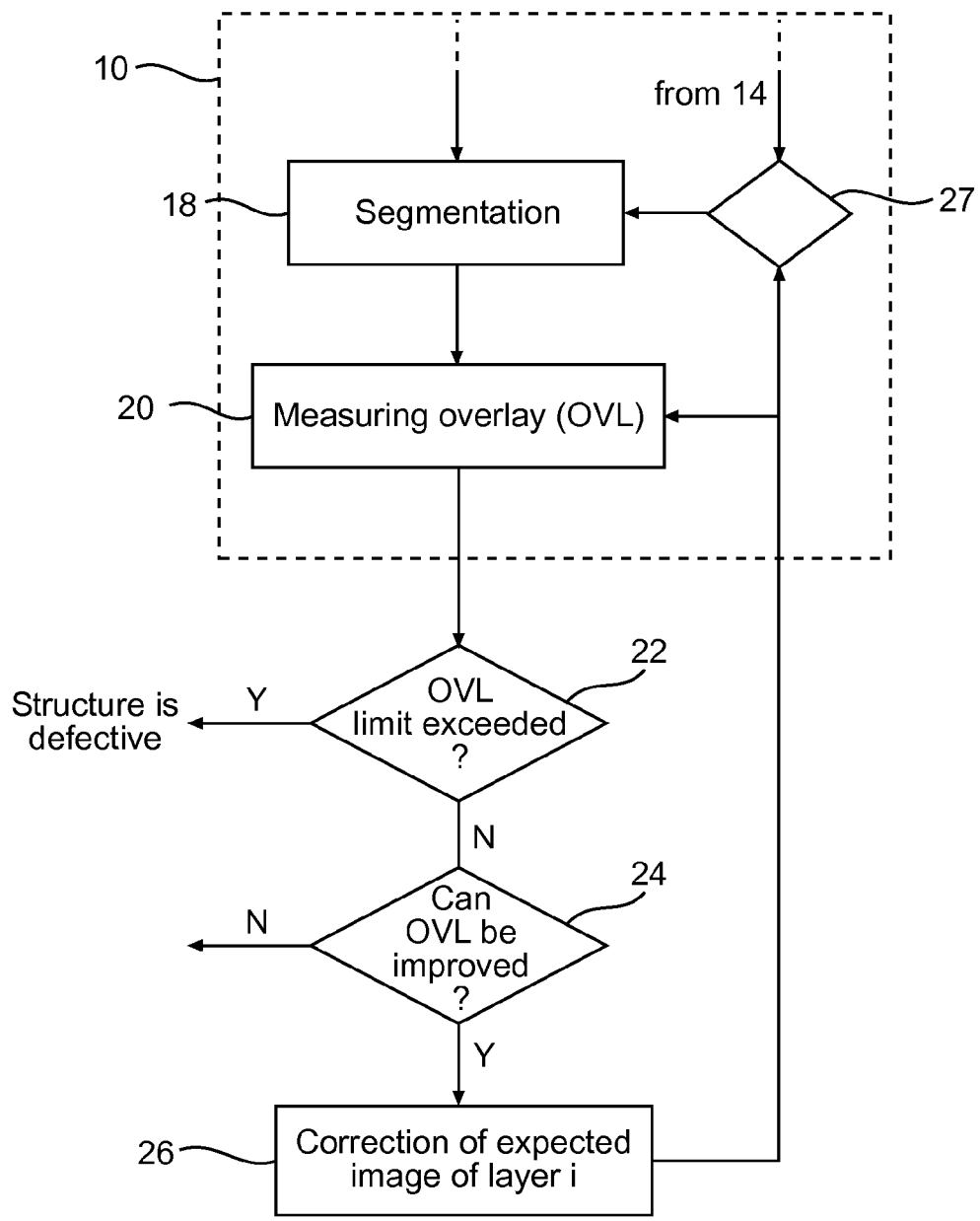
FIG. 4 illustrates a block diagram of a further version of the proposed method, which comprises feedback that allows improving overlay at further steps of manufacturing/inspection based on the obtained measurements.

FIG. 4 illustrates a flowchart of a modified method for overlay measurement, which comprises a feedback based on the measurement results. For example, such a method comprising the feedback may start with the flowchart 10 described with reference to FIG. 2.

In the example of FIG. 4, the flowchart 10 is shown partially: only blocks 18 and 20 are seen.

When an overlay result is calculated (for example, by Block 20 of flowchart 10), the result is compared with a predetermined OVL limit (block 22). If the limit is exceeded, the product (such as a semiconductor wafer) is considered defective. The defective wafer may be discarded; alternatively, upper layer(s) of the structure may be removed and then deposited again.

If the OVL limit is not exceeded, OVL can be improved in case there are available resources to perform it (since additional rounds for improving accuracy cost extra time, energy, materials, etc.—block 24). If yes, the Inventors suggest improving the overlay by adjusting the expected (design) image of one or both of the two layers which were checked for their overlay (block 26). For example, simulation of the expected image(s) may be adjusted, and/or the expected images (CAD-images) may be shifted one relatively to another, etc.

The corrected expected image of a specific layer is then fed back to the Segmentation block 18 to improve results of Segmentation. The Segmentation will be then performed with reference to the updated expected image of that layer (at least in box 18.2). Box 27 receives information on the expected layer image from block 14 and block 26, and will select there-between the most update information for feeding it to block 18.

Such updated information from block 26 will also be fed to block 20 which is responsible for measuring OVL. Owing to that, at the next round of fabrication, overhead will be re-calculated with reference to the corrected expected image of that specific layer.

At a specific stage of the process, a decision can be made at block 24 that any further improvement of OVL is useless or too expensive.

Figure 5:
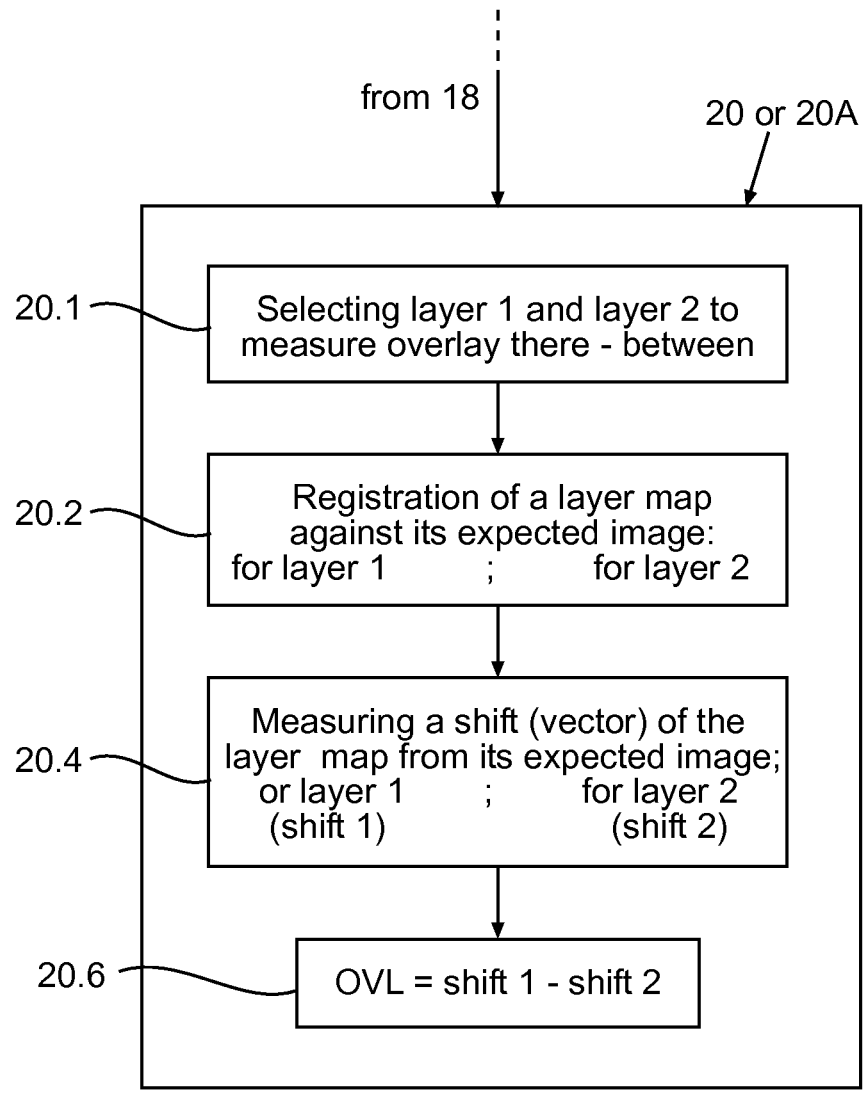
FIG. 5 illustrates a block diagram of one exemplary process (using per layer registration) for measuring overlay between two selected layers of the multilayer structure.

FIG. 5 illustrates one possible version of measuring overlay based on the general algorithm defined in block 20 (FIG. 2), optionally using a modified version defined in block 20A (FIG. 3). General algorithm of block 20 schematically describes the combined processing of maps and expected images of any two selected layers, to measure overlay there-between. Block 20A adds to Block 20 a possibility to perform the processing using so-called safe areas.

FIG. 5 schematically illustrates a specified flowchart of OVL calculation, which comprises:

Box 20.1, where any two layers (called layer 1 and layer 2) are selected to measure OVL there-between;

Box 20.2, where registration is performed for each of the selected layers. Such a per-layer registration comprises aligning of the expected image (say, a CAD image or a simulated CAD image) of a specific layer against its map (SEM-map). The operation is performed for layer 1 and for layer 2 based on their respective CAD and SEM images. The per-layer registration may be facilitated, if performed based on safe areas preliminarily defined on the expected images (CAD-simulated images) and maps (SEM-images) of the layer.

Box 20.4 comprises measuring a shift (an x/y vector) of a layer's map from the layer's expected image. For layer 1, the measured vector will be called "shift 1". Upon measurement of such a vector for layer 2, "shift 2" is received.

Box 20.6 comprises calculation of overlay (OVL) as a difference between the two shifts obtained at box 20.4.

FIG. 6 shows another version of measuring overlay (OVL) between any two layers of the multilayer structure. The concept of safe areas is utilized in this version, therefore the algorithm is generally marked as 20A. However, the version differs from the one of FIG. 5 by some new operations performed with the safe areas:

Box 20.1—selecting two layers for the OVL measurement (the same as in FIG. 5).

Box 20.3—calling, from the computer memory, the maps of the two selected layers (i.e., segmentation maps of the layers) and ensuring that the maps are arranged in their real mutual positions (as in the structure).

Box 20.5—safe areas are identified on the layer maps. Let for example, safe area 1 (MSA1) is identified on the layer map of layer 1, and safe area 2 (MSA2) on the map of layer 2.

Box 20.7—determining Centers of Gravity (COGs) for the identified safe areas, and measuring vector V1 between the COGs of the two safe areas MSA1 and MSA2. The vector V1 will indicate a "visible overlay" between maps of the layers. In our example, vector V1 is determined for the Segmentation maps of the layers.

Box 20.9—is for obtaining from the computer memory two expected images of the layers 1, 2, and for placing these expected images in their designed mutual positions.

20.11—on the expected images of layers 1 and 2, identifying the segments which correspond to the safe areas MSA1, MSA2 of the respective layer maps. These segments are actually the safe areas ESA1, ESA2 of the expected images.

20.13—finding COGs of these segments (ESA1, ESA2), and measuring vector V2 between the COGs of ESA1 and ESA2. In our example, V2 is determined for the expected images being CAD-images of the layers.

20.15—calculating overlay OVL between the layers 1 and 2 as the difference between the vectors V1 and V2.

FIG. 7 comprises six parts 7*a*-7*f*.

Part 7*a* is a combined expected image of a 4-layer structure, where features/elements of each layer are marked by digits 1-4. Each digit (1, 2, 3, 4) indicates the number of the layer where the feature is to be located according to the design. In this example, the expected image is a simulated design image.

Part 7*b* shows a schematic pictorial view of the given image (in this example, a SEM-image) of the real structure. Spots of the given image may be then segmented by referring to the expected image of Part 7*a*.

Part 7*c* is an expected image of layer 3, where the dark silhouette corresponds to the diagonal element located on layer 3. A dashed contour around the diagonal element 3 shows its allowed size deviation (delta-3). Dashed vertical lines show limits of size deviation of a vertical element 4 which is located on layer 4. The size deviation of the element 4 is marked as delta-4. In reality, element 4 partially occludes element 3.

There is also an arrow "OVL lim" which schematically shows the limit of overlay between layer 3 and layer 4.

Part 7*d* shows a segmentation map of layer 3, obtained upon segmentation of the given image of Part 7*b*. The map of layer 3 (Part 7*d*) shows only the segments of layer 3 which are seen on the given image. This map of layer 3 may be used for performing registration with the expected image of layer 3 (Part 7*c*) for further measurement of overlay, for example between layer 3 and layer 4.

Part 7*e* schematically shows how expected safe areas ESA may be defined on the expected image of layer 3, if we are to determine mutual positions (overlay) between layers 3 and 4. ESA of layer 3 are the areas which will remain visible in the worst case of offset i.e., when both the size deviations and the overlay concerning layers 3, 4 take place.

FIG. Part 7*f* schematically shows safe areas MSA on the map of layer 3, which, in the worst case, may correspond to the safe areas ESA on the expected image of that layer.

FIG. 8 presents a pictorial illustration of how to measure overlay between two exemplary layers (layer 1 and layer 2), using the concept of safe areas. The relevant algorithm is generally described with reference to FIG. 6.

Let the left-hand portion "A" of FIG. 8 illustrates two expected images (CAD-images) of layers 1 and 2 in their expected position with respect to one another. The right-hand portion "B" shows two segmentation maps of the layers 1 and 2, in their real position regarding one another.

It should be reminded that areas which are not occluded at a specific layer, are considered safe areas of that layer.

Let layer 1 is an upper layer, and layer 2 is a lower layer. On layer 1, there is a vertical element marked L1, which is seen as non-occluded. On layer 2, there is a diagonal element marked L2. L2 is partially occluded by L1 according to the design (the left-hand diagram "A" of FIG. 8). L2 is partially occluded by L1 also on the real, Segmentation maps of the layers (the right hand portion "B" of FIG. 8), but one may notice that the position of L2 is visually shifted due to some deviations of sizes and/or overlay.

Let the darkened segments are safe areas of the element L2. At the portion "B", the darkened segment of L2 and the whole L1 are mapped safe areas (MSA). At the portion "A", only the darkened segment of L2 suitable to "B" and the whole L1 are ESA.

Now Centers of Gravity (COG) are determined for all the safe areas.

Then, vector V1 is determined for "B" (SEGM-maps of layers 1, 2), as a difference between COGs of the two safe areas MSA located at two different layers 1 and 2.

Analogously, vector V2 is determined for "A" (CAD-images of layers 1, 2), as a difference between COGs of the two safe areas ESA located on two different layers 1 and 2.

Finally, the overlay between layer 1 and layer 2 is calculated as a difference between the vectors V1 and V2: OVL=V1−V2.

Though the invention has been described with references to specific examples and drawings, other, modified versions of the method and different implementations of the system might be proposed, which should be considered part of the invention whenever defined by the following claims which follow.

The invention claimed is:

1. A method for determining overlay between layers of a multilayer structure, the method comprising:
    obtaining a given image representing the multilayer structure;
    obtaining expected images of layers of the multilayer structure;
    generating a combined expected image of the multilayer structure as a combination of the expected images of said layers;
    performing registration of the given image against the combined expected image;
    providing segmentation of the given image to produce a segmented image and maps of the layers of said multilayer structure; and
    determining, by a computer processor, an overlay measurement between any two selected layers of the multilayer structure by processing the maps of the two selected layers with the corresponding expected images of said two selected layers.

2. The method according to claim 1, wherein at least one of the combined expected image or the expected images of the layers are design images processed by simulation.

3. The method according to claim 1, wherein the multilayer structure is a semiconductor structure three-dimensional integrated circuit (3D IC), the given image is a scanning electron microscope (SEM)-image of the 3D IC, the expected images are simulated design images of the layers, the combined expected image is formed by combining the simulated design images of the layers based on an order of the layers and expected occlusions, the segmentation is SEM-image segmentation to produce SEM-maps of the layers, and the overlay measurement between the two selected layers of the 3D IC is determined by processing the SEM-maps of the two selected layers using the expected images of said two selected layers.

4. The method according to claim 1, wherein said segmentation is based on the expected images of the layers.

5. The method according to claim 1, further comprising enhancing the segmentation by adjusting at least one of the expected images.

6. The method according to claim 1, further comprising determining safe areas on the expected images and on the maps of the layers based on probable occlusions and distortions between the expected images and the given image.

7. The method according to claim 6, wherein said determining of the overlay measurement between the two selected layers of the multilayer structure is performed by utilizing the determined safe areas.

8. The method according to claim 1, wherein the determining of the overlay measurement between the two selected layers of the multilayer structure comprises:
    for each of the two selected layers, performing per-layer registration between the respective map of a specific layer of the two selected layers with the respective expected image of the specific layer;
    for each of the two selected layers, measuring a shift of the specific layer by comparing the respective map of the specific layer with the respective expected image of the specific layer to determine two shifts of the two selected layers respectively; and
    determining the overlay measurement between said two selected layers as a difference between said two shifts.

9. The method according to claim 8, further comprising:
    determining safe areas on the expected images and on the maps of the layers based on probable occlusions and distortions between the expected images and the given image; and
    performing said per-layer registration based on the safe areas.

10. The method according to claim 6, wherein said determining of the overlay measurement between the two selected layers of the multilayer structure comprises:

choosing two map safe areas (MSAs) of pixels respectively appearing in the respective maps of the two selected layers;

allocating two expected safe area (ESA) segments appearing in the respective expected images of the two selected layers, said two ESA segments respectively corresponding to said two MSAs of pixels;

determining a vector of overlay $S_{img}$ for the two chosen MSAs by calculating a first difference between Centers of Gravity of the two chosen MSAs;

determining a vector of overlay $S_{exp}$ for the two ESA segments by calculating a second difference between Centers of Gravity of the two chosen MSAs; and determining the overlay measurement between the two selected layers by calculating a difference between $S_{img}$ and $S_{exp}$.

11. The method according to claim 1, further comprising:
using feedback pertaining to the determined overlay measurement to correct the segmentation.

12. The method according to claim 11, further comprising:
re-determining of the overlay measurement using the corrected segmentation.

13. The method according to claim 1, further comprising:
determining a respective overlay measurement for each layer of the multilayer structure with respect to remaining layers of the multilayer structure.

14. A system for image processing comprising:
a memory configured to store a given image of a multilayer structure and expected images of layers of the multilayer structure; and
a processor configured to:
generate a combined expected image of the multilayer structure as a combination of the expected images of said layers;
register the given image against the combined expected image;
segment the given image to produce a segmented image and maps of the layers of the multilayer structure; and
determine an overlay measurement between any two selected layers of the multilayer structure by processing the maps of the two selected layers with the corresponding expected images of said two selected layers.

15. A computer software product including a non-transitory computer-readable medium storing instructions, when executed by a computer processor, cause the computer processor to perform operations comprising:
obtaining a given image representing a multilayer structure;
obtaining expected images of layers of the multilayer structure;
generating a combined expected image of the multilayer structure as a combination of the expected images of said layers;
performing registration of the given image against the combined expected image;
providing segmentation of the given image to produce a segmented image and maps of the layers of said multilayer structure; and
determining, by the computer processor, an overlay measurement between any two selected layers of the multilayer structure by processing the maps of the two selected layers with the corresponding expected images of said two selected layers.

* * * * *